Sept. 23, 1941.  A. A. CORY  2,256,472
RADIO DIRECTION FINDER DEVIATION CORRECTION DEVICE
Filed Oct. 20, 1939    4 Sheets-Sheet 1

INVENTOR
ABRAM A. CORY
BY
ATTORNEY

INVENTOR
ABRAM A. CORY
BY
ATTORNEY

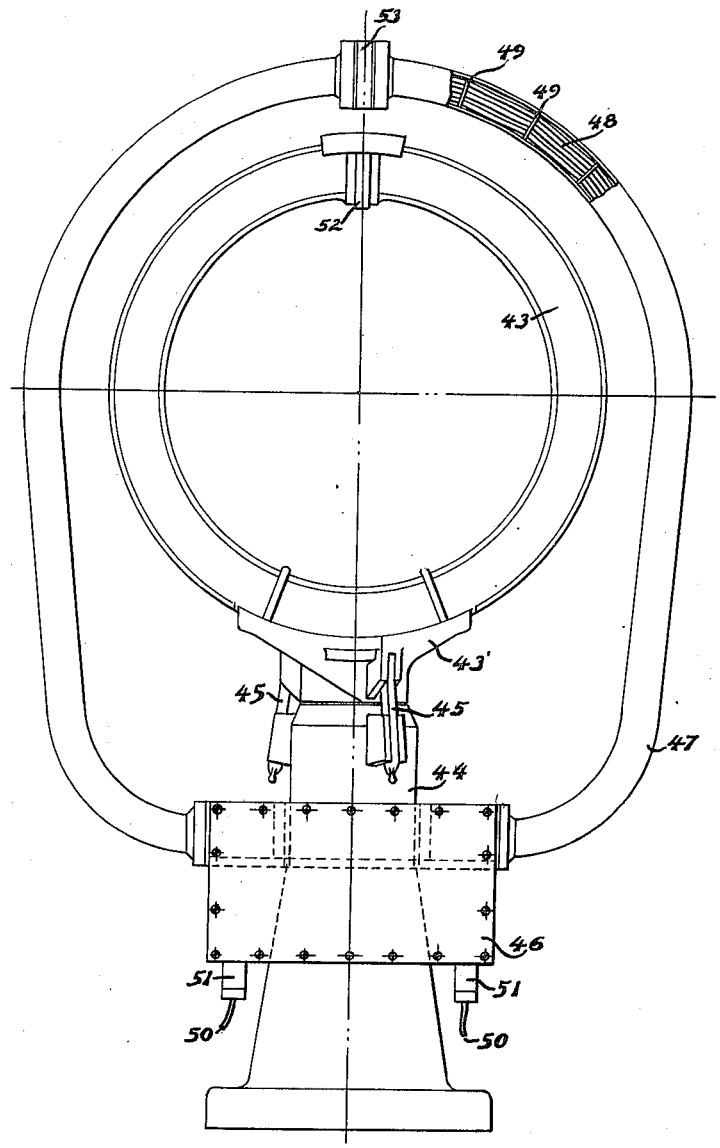

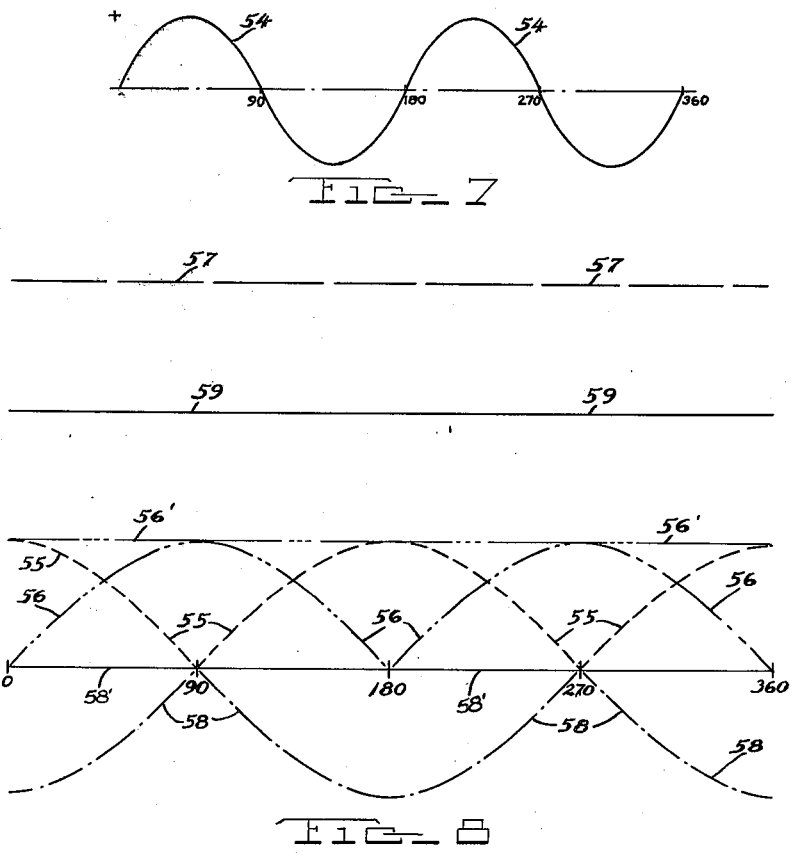

Patented Sept. 23, 1941

2,256,472

UNITED STATES PATENT OFFICE 2,256,472

RADIO DIRECTION FINDER DEVIATION CORRECTION DEVICE

Abram A. Cory, Portsmouth, Va.

Application October 20, 1939, Serial No. 300,404

1 Claim. (Cl. 250—11)

(Granted under the act of March 3, 1883, as amended April 30, 1928; 370 O. G. 757)

My invention relates generally to radio direction finders and particularly to devices for correcting the errors or deviation of radio direction finders installed on shipboard, and on aircraft.

It is well known that radio direction finders installed on shipboard are subject to errors arising from the character of the ship's mass whereby the apparent bearing of a distant source of radiations, as determined by the radio direction finder reading, differs somewhat from the correct bearing. The prior art discloses a number of devices for correcting this deviation between the radio direction finder and the true bearings. My invention embodies such a correcting device and possesses advantages not heretofore obtainable.

An object of my invention is to provide an improved system for shipboard radio direction finder deviation correction employing an athwartships collector loop which may be installed on board ship at a point remote from the radio direction finder loop.

Another object of my invention is to provide an improved system for shipboard radio direction finder deviation correction that employs a coupling means of great flexibility.

A further object of my invention is to provide an improved system for shipboard radio direction finder deviation correction that increases the output of the radio direction finder loop while effectively correcting radio direction finder deviation.

My invention will be described in connection with the accompanying drawings showing certain preferred forms of my invention, in which Fig. 1 shows a schematic diagram of an arrangement utilizing collector loops connected directly to an inductor coil coupled to the direction finder loop.

Figure 5:
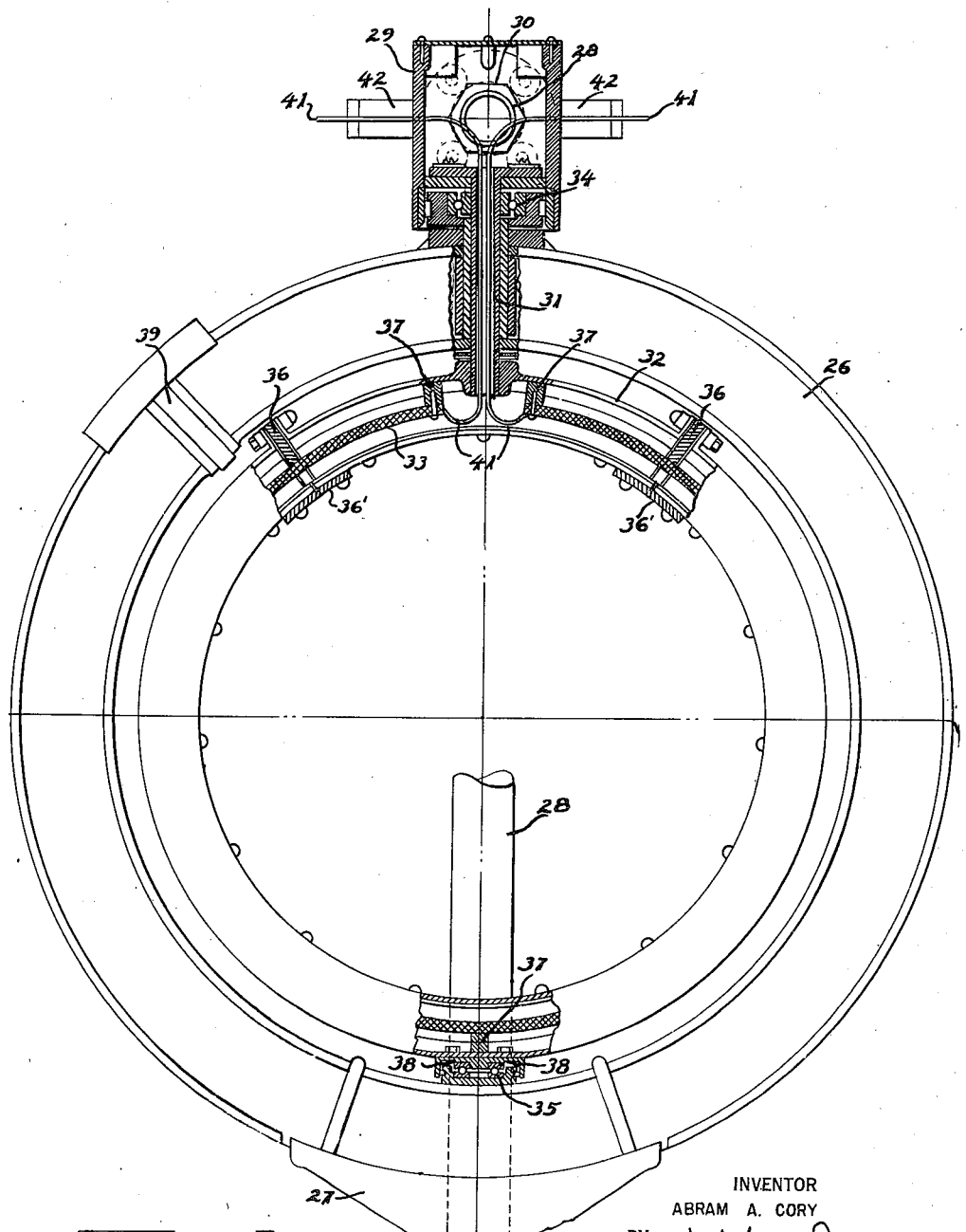

Fig. 5, partly in section, shows the mechanical design of a concentric inductor coil and radio direction finder loop, with the inductor coil circumscribed by the radio direction finder loop.

Fig. 6, also partly in section, shows the mechanical design of a concentric inductor coil and radio direction finder loop, with the inductor coil circumscribing the direction finder loop.

Fig. 7 shows a typical uncorrected deviation curve for a normal shipboard radio direction finder installation, and Fig. 8 shows a group of curves indicating the strength of the electromagnetic fields at a radio direction finder installed on shipboard.

Figure 1:
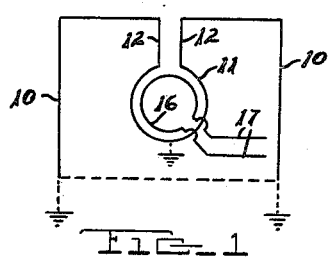
Figure 2:
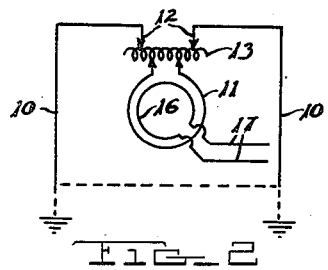
Fig. 2 shows a schematic diagram of an arrangement utilizing collector loops coupled to an inductor coil through an auto transformer and with the inductor coil coupled to the direction finder loop.
Figure 3:
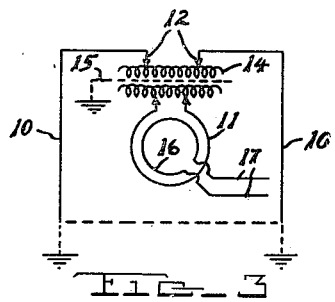
Fig. 3 shows a schematic diagram of an arrangement utilizing collector loops coupled to an inductor coil through a transformer, with the inductor coil coupled to the direction finder loop.

Referring to Figs. 1, 2 and 3, collector loops 10 are connected to the fixed inductor coil or coils 11 through connectors or transmission lines 12, either directly as in Fig. 1, or through an auto transformer 13, as in Fig. 2, or through a transformer 14, as in Fig. 3. A grounded electrostatic shield 15 is preferably employed between the primary and secondary windings of the transformer 14 of Fig. 3 to prevent undesired electrostatic coupling. Fixed inductor coil or coils 11 are preferably though not necessarily disposed substantially concentric with a conventional rotatable radio direction finder coil or loop 16 and are closely coupled thereto. Conductors 17 from loop 16 connect to the input of a conventional radio direction finder radio receiver (not shown). Collector loops 10 and inductor coils 11 are preferably disposed in parallel athwartships planes. Collector loops 10 are preferably so disposed as not to surround the radio direction finder loop, or to affect it directly, but to affect it only through the fixed inductor coils 11. The lower normally horizontal conductor of collector loops 10 is usually the conductive ship's hull, as in the usual installation the lower ends of the normally vertical conductors of the collector loops 10 are grounded to the conductive ship's hull. Collector loops 10 may be located at any convenient position on board the ship.

Figure 4:
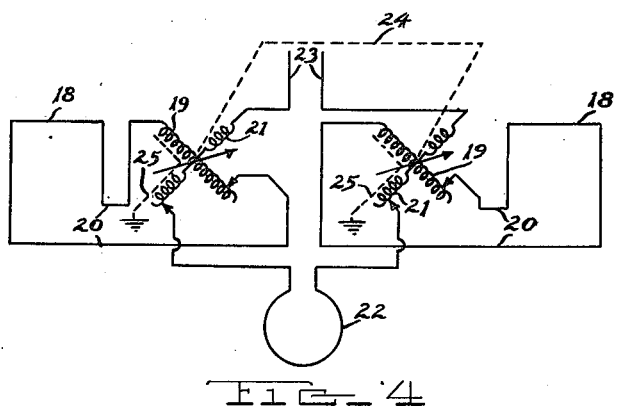
Fig. 4 shows a schematic diagram of an arrangement utilizing collector loops coupled to the radio direction finder loop circuit, through a variable inductive coupling device.

In Fig. 4, two symmetrical collector loop circuits are shown, each comprising an athwartships collector loop 18 and a fixed tapped inductor coil 19 connected in series. Conductors 20 connect the collector loops 18 to the fixed inductor coils 19. Inductively coupled to each fixed coil 19 is a rotatable tapped inductor coil 21, both rotatable coils 21 being electrically connected in series with conventional radio direction finder coil or loop 22. Conductors 23 are connected to the input of a conventional radio direction finder radio receiver (not shown). Both inductor coils 21 rotate with radio direction finder coil 22, as indicated by dotted line 24. A grounded electrostatic shield 25 prevents undesired capacitive coupling between coils 19 and 21. By the use of this arrangement radio direction finder coil 22 may be located remotely from coils 19 and 21. Fixed inductor coils 19 are preferably disposed in substantially athwartships planes with rotatable inductor coils 21 disposed in planes which at all times parallel the plane of the radio direction finder loop. However, coils 19 and 21 may be disposed in other planes if desired, provided the proper angular displacement between coils 19 and 21 occurs as the radio direction finder loop is rotated.

In each of the above forms of my invention, maximum corrector action is obtained when the combined impedance of the collector loops and connecting conductors equals the impedance of the fixed inductor coils. In Figs. 2, 3 and 4, the above impedances may be matched by adjusting transformer or coil turn ratios. Deviation correction or action may be further regulated upon installation by varying the number of turns of the inductor coil as well as its distance from the rotatable radio direction finder coil. Deviation correction is accomplished only when the correct polarities are observed in connecting the collector loop to the fixed inductor coil. Unless correct polarities are observed deviation will be increased and not decreased. Figs. 1 to 4, inclusive, show a single turn in the radio direction finder coil, and Figs. 1, 2 and 3 show only a single turn in the fixed inductor coil. In practice, however, each of these coils will be formed of a plurality of turns.

The fixed inductor coils in any form of my invention may either circumscribe or be circumscribed by the radio direction finder coil. In Fig. 5 a form of the latter type is shown, in which rotatable loop casing 26 containing the radio direction finder coil or loop (not shown), is clamped to rotatable saddle 27. Saddle 27 is supported by a fixed vertical support (not shown) and rotates freely about a vertical axis through the center of such support. A rod 28, in the form of a modified C, is clamped at its lower end to the aforementioned vertical support and its upper end is secured to junction box 29 by nut 30. A vertical tube 31 with an integral flange at its upper end screwed to junction box 29, partially supports metallic casing 32 of fixed inductor coil 33, and holds it securely against rotation. Both loop casing 26 and the radio direction finder loop rotate freely about tube 31 in upper ball bearings 34, tube 31 passing through loop casing 26. Lower ball bearing 35 likewise permits free rotation of the radio direction finder loop and its casing 26 about the fixed inductor coil 33, assists in the alignment of the loop and inductor coil casings 26, 32, and partially supports fixed inductor coil 33 and its casing 32. Casing 32 is not continuous but is broken by insulators 36 and 36' to prevent total shielding and to permit symmetry of grounding through grounding brushes 38 of the lower bearing 35. An insulator 39 is likewise inserted in loop casing 26. Fixed inductor coil 33 is supported within casing 32 by insulators 37. Conductors 41 from coil 33 pass upward through tube 31 and outward through stuffing boxes 42 of junction box 29 and connect to the collector loop (not shown), either directly or through a coupling device, as described above.

In Fig. 6, radio direction finder coil or loop casing 43, containing the radio direction finder coil or loop (not shown), is clamped to saddle 43' and both rotate about a vertical axis through the center of a fixed vertical support 44. When not in use, the rotatable members may be locked in place by disengageable dogs 45, as shown. Junction box 46, secured to fixed support 44, supports fixed inductor coil casing 47, which circumscribes the radio direction finder loop. Casing 47 contains fixed inductor coil 48 which is made up of a plurality of conductors supported by spaced insulators 49. A coupling device of one of the previously described types may be contained within the junction box 46. Conductors 50 from the collector loop (not shown) pass through stuffing boxes 51 and connect to fixed inductor coil 48, either directly or through a coupling device. Insulators 52 and 53 are inserted in casings 43 and 47 respectively, to prevent total shielding and to permit symmetry of grounding.

Curve 54 of Fig. 7 is a typical uncorrected quadrantal deviation curve of a shipboard radio direction finder, plotted with degrees of radio direction finder bearing of a signal source as abscissae, and with degrees of deviation or difference between the actual bearing and the radio direction finder bearing as ordinates. Both the actual bearing and the radio direction finder bearing are relative with respect to the heading of the ship, the heading of the ship being 0° with the numerical value of other bearings increasing in a clockwise direction from the ship's heading, from 0° to 360°. The radio direction finder bearing is the relative direction in which the horizontal axis of the radio direction finder coil or loop points when minimum response to the signal source is heard in the output of the radio receiver connected to the radio direction finder coil. The radio direction finder horizontal axis is perpendicular to the plane of the radio direction finder loop or coil and passes through the center of such coil. The signal source is assumed to radiate a signal of unvarying strength at the source and to remain at a constant distance from the radio direction finder coil.

The field strength curves of Fig. 8 are plotted with degrees of bearing of the aforementioned signal source relative to the ship's heading as abscissae, and with electromagnetic field strength units at the radio direction finder coil as ordinates. Curve 59, a horizontal straight line, represents the signal field strength if the radio direction finder coil were unaffected by local fields due to closed loops or conductors in its vicinity. Curve 55 represents a local athwartships field due to the conductive ship's mass and illustrates how the strength of this field varies with change of relative bearing of the signal source. Curve 56 represents a local fore and aft field set up by the collector loop and inductor coil system of my invention alone. Curve 56', a horizontal straight line tangent to the peaks of curves 55 and 56, is the resultant of curves 55 and 56. Curve 57, a horizontal straight line above curve 59 represents the resultant of curves 56' and 59. Curve 58 represents an athwartships field set up by fore and aft closed loops located in the vicinity of and approximately concentric with the radio direction finder loop, as described in the prior art. Curve 58', a horizontal straight line substantially coincident with the zero axis, is the resultant of curves 55 and 58.

My invention is employed in connection with a conventional radio direction finder having a rotatable pick-up coil of a plurality of turns substantially in the same plane, the axis of the coil being substantially horizontal and its axis of rotation being vertical and at right angles to the coil axis. Such has the familiar figure eight directional characteristic, there being maximum response in the radio direction finder radio receiver to the signals arriving from a direction parallel to the plane of the coil, and minimum response signals arriving from a direction perpendicular to the plane of the coil, i. e., the direction of the coil axis.

When a radio direction finder having such a coil is located on a ship having a conductive hull, it has been found that the metallic mass of the ship receives and absorbs energy from a signal source and sets up a local electromagnetic field in the vicinity of the radio direction finder loop. It has also been found for purposes of this and subsequent explanation that the ship's mass acts substantially in the same manner as a fore and aft closed loop and that the local electromagnetic field it sets up is substantially athwartships. The radio direction finder coil is affected by both this local field and the electromagnetic field from the source. As a result, minimum response is obtained not when the axis of the coil points directly toward the signal source, but when it points in such a direction that the voltage induced in the radio direction finder coil by the resultant of this local field and the signal field in minimum. This direction is usually a few degrees away from the direction of the signal source. The local electromagnetic field due to the ship's hull may be said to so affect the electromagnetic field of the signal source that the wave front from such source is rotated or deflected through an angle dependent upon the relative direction and strength of these two fields at the radio direction finder coil.

Referring to curve 54 of Fig. 7, which is a typical deviation curve of the radio direction finder having such a rotatable coil and installed on a ship having a conductive hull, when the direction of the source is parallel or perpendicular to the longitudinal axis of the ship, the errors are reduced to zero, as indicated at the points marked 0°, 90°, 180°, 270° and 360°. However, at intervening points the errors fluctuate somewhat in the manner of a sine curve, being, for example, positive and of varying values between 0° and 270°, and negative and of varying values between 90° and 180° and between 270° and 360°.

Obviously, from curve 54 the error of each bearing could be determined and the proper correction applied to the radio direction finder reading, but such is time-consuming and highly subject to error, which may lead to injury to the vessel. To overcome the necessity for the above, I have devised a system that produces a local electromagnetic field, which, acting together with the local field produced by the ship's mass and the field due to the signal source, forms a resultant field of substantially uniform strength in all horizontal directions. This resultant field, which includes the normally deviation-producing field due to the ship's mass, is symmetrical about a normally vertical axis through the center of the radio direction finder coil and produces no deviation of the radio direction finder.

As previously described, the ship's hull may be considered as a fore and aft closed loop. Such is disposed below the radio direction finder and sets up the deviation-producing athwartships field. I produce, by the use of the aforementioned athwartships collector loops and coupling coils, a local fore and aft field to so complement this athwartships field that a horizontal, symmetrical field results. I preferably place the athwartships collector loop in such a position that it will not affect the radio direction finder loop directly, and conduct or couple the current flowing in the collector loop to the athwartships coupling coil in such a manner that the current flow in the coupling coil produces the desired fore and aft field. The variable coupling systems shown in Figs. 2, 3 and 4, are employed not only to match impedances but also to vary the current flow in the coupling coil so as to produce a fore and aft field of such strength as to symmetrize the electromagnetic field acting on the radio direction finder coil.

It is obvious, if the resultant electromagnetic field acting on the radio direction finder is symmetrical, that the radio direction finder will have substantially no error or deviation and will indicate an actual bearing of the signal source when minimum response to signals from such source is produced in the radio direction finder receiver output. The inductor coil of my invention is so designed and proportioned as to produce the necessary field pattern for a minimum of deviation.

Furthermore, considering the effects of the ship's mass and of my athwartships collector loop and coupling coil separately, it can likewise be understood that my device will compensate for the deviation produced by the ship's mass. Referring to Fig. 7, when the plane of the radio direction finder coil is athwartships and in a position to respond to a minimum extent to the source in line with the longitudinal or fore and aft axis of the ship, there is no deviation or error in the indication, as represented by the 0° or 180° point on curve 54. Here also the collector loop 10 (Figs 1, 2 and 3) is in the position for a minimum response to such source, and, although the fixed inductor coil 11 and the radio direction finder coil 16 are in the position of maximum inductive coupling, there is no current flow in either the collector loop or the inductor coil and no local fore and aft field set up thereby, the radio direction finder coil is unaffected and hence there is no correction, as it should be. Similarly, when the source is in a line perpendicular to the fore and aft axis of a ship, the error or deviation is again 0°, as indicated at the 90° or 270° point on curve 54. The correction here also is zero, for although the collector loop is in a proper position for maximum response with maximum current flowing in both the collector loop and the inductor coil and a local bore and aft field of maximum strength thus set up, the plane of the inductor coil is disposed 90° from the plane of the radio direction finder coil (so disposed to respond to a minimum extent to the source), the two coils are not in inductive coupling, and the radio direction finder coil is unaffected by the local field set up by the inductor coil. Similar conditions exist at other zero points—either no current is flowing in the collector loop and hence the inductor coil, or the inductor coil is not in energy-transferring relation with respect to the radio direction finder coil. However, on all bearings between the zero positions as shown on Fig. 7, the collector loop is so disposed with reference to the signal source that current will be induced in it by the source, and this current, flowing in the inductor coil, sets up a fore and aft local field. The strength of this local field depends upon the angular relation between the plane of the collector coil and the direction of the signal source. Further, on these same bearings (i. e., between the zero positions of Fig. 7), the radio direction finder is so disposed as to always be in inductive coupling with the inductor coil, the degree of coupling being variable, however, with the relative positions of the planes of the inductor coil and radio direction finder loop. The strength of this locally produced fore and aft field, variable as it is with the direction of the signal source, is made of such a value, that, when acting with the local field due to the ship's mass and the field from the source, a symmetrical resultant field in all horizontal directions is produced.

The above is illustrated graphically in Fig. 8. Curve 55, representing the strength of the local athwartships field produced by the ship's conductive mass, shows that this field has a maximum strength when the signal source is directly ahead or directly astern of the ship and minimum strength when the signal source is directly abeam. Bearing in mind that the ship's hull may be considered as a fore and aft loop, the above is to be expected, since maximum current is induced in any closed loop by a signal source when the direction of such source is in line with the plane of the loop, and minimum current is induced in such loop when the direction of the source is at right angles to the plane of the loop. Since the field produced by a closed loop is at right angles to its plane, it is also apparent that the field produced by the ship's mass is athwartships. At intermediate points, the strength of this athwartships field produced by the ship's mass is such that curve 55 has somewhat the shape of a cosine curve with the negative ordinates thereof drawn positive. The strength of the fore and aft field produced by the athwartships collector loop and inductor coil of my invention varies with change of relative bearing of the signal source in the manner shown by curve 56. When the signal source is directly ahead or astern of the ship, the direction of the source is at right angles to the athwartships collector loop of my invention and no current is induced in such loop. However, when the signal source is directly abeam of the vessel, the direction of the signal source is in line with the plane of the collector loop, maximum current flows in the loop, and this current, flowing in the inductor coil, produces a fore and aft field of maximum strength. At intermediate points the strength of the fore and aft field produced is such that curve 56 has somewhat the shape of sine curve with the negative ordinates thereof drawn positive. If the constants of the collector loop and inductor coil of my invention are properly chosen the maximum ordinate of curve 56 can be made to equal that of curve 55, as shown. If this is done the resultant of curves 55 and 56 is curve 56', a horizontal straight line tangent to the peaks of curves 55 and 56. Curve 56' is produced by adding as two vectors 90 degrees apart the ordinates of curves 55 and 56 for each bearing, since the field produced by the ship's hull and that produced by the collector loop and inductor coil of my invention are 90 degrees apart. The resultant field due to the ship's hull, the collector devices of my invention and the signal source is shown by curve 57, produced by combining curves 56' and 59. Since the resultant field as illustrated by curve 57 is of uniform strength on all bearings, it produces no deviation of the radio direction finder.

Curve 58, which illustrates the manner in which the strength of an athwartships field produced by the fore and aft correctors of the prior art varies with change of bearing of the signal source, has a shape similar to that of curve 55, as would be expected since this field is also produced by a fore and aft loop. However, since the fore and aft correctors of the prior art circumscribe the radio direction finder loop and are generally substantially concentric therewith, the field produced by such correctors is in opposition to that produced by the ship's hull. By varying the number of turns, disposition, etc. of the fore and aft circumscribing closed loop, a field can be produced of such strength as to nullify the effect of the local field due to the ship's hull. Curve 58 illustrates such a field. Curve 58', which is substantially coincident with the zero axis, is the resultant of curves 55 and 58. Thus with the fore and aft correctors of the prior art properly installed, the effect of the deviation producing athwartships field due to the ship's mass is completely nullified and there remains only the field (curve 59) due to the signal source to act on the radio direction finder coil. Since this field is of uniform strength on all bearings it likewise produces no deviation of the radio direction finder.

From the above, it is apparent that the devices of my invention not only correct the deviation or errors of the radio direction finder but also in so doing substantially increase the resultant field strength at the radio direction finder as compared with prior methods. This is an important feature of my invention.

The collector loop of my device preferably should not surround the radio direction finder rotatable coil, or be substantially concentric therewith, for in such a case the fore and aft component of the signal field will be weakened and not strengthened, and the radio direction finder deviation or error will tend to be increased. All appreciable coupling between the collector loop of my device and the radio direction finder coil should be through the fixed inductor coil. However, since the influence of the inductor coil on the radio direction finder is stronger than that of the collector loop, my invention will still operate in a satisfactory manner if some coupling exists between the collector and the radio direction finder loops.

A particular feature of my invention and one of its advantages lies in its flexibility. In the first place, the collector loops may be located at any convenient place on shipboard. By the use of the coupling devices shown in Figs. 2, 3 and 4, the current coupled into the inductor coil and the strength of the resulting electromagnetic field is readily controllable. The coupling coil may either surround the radio direction finder coil or be surrounded by it, as convenient. The number of turns of the collector loop may be varied as necessary. Further control of deviation may be secured by properly proportioning the inductor coil to regulate the field pattern. By the proper choice of constants, the desired fore and aft field strength may easily be produced and after installation may easily be varied as necessary by the use of the coupling devices shown.

However, the outstanding advantage of my invention is the increase of radio direction finder sensitivity and output it affords over former systems. It has been shown above that my invention produces a substantial increase in electromagnetic field strength at the radio direction finder coil as compared with the former fore and aft concentric loop corrector system. Since the radio direction finder coil output is a function of the strength of the electromagnetic field acting on the coil, it is evident that my invention provides increased output voltage while effectively correcting radio direction finder deviation; or, otherwise expressed, provides the same output voltage with a weaker electromagnetic field produced at the radio direction finder coil by the signal source. It has been found by actual installation on shipboard that an output increase of several decibels is easily obtained over prior deviation correction devices by the use of my invention.

It should be noted that my invention does not interfere with nor prevent the use of sense antennae with the radio direction finder to eliminate bilateral ambiguity, nor does it prevent proper balancer action.

Other modifications and changes in the proportions and arrangements of parts may be made by those skilled in the art without departing from the nature of this invention within the scope of what is hereinafter claimed.

The invention described herein may be manufactured and/or used by or for the Government of the United States of America for governmental purposes without the payment of any royalties thereon or therefor.

I claim:

Deviation-corrected radio direction finders for use aboard ship, comprising a rotatable direction finding coil, two collector loops disposed athwartships, a fixed athwartships inductor coil connected in series with each said collector loop, an inductor coupled to and disposed in the immediate vicinity of each said inductor coil, said inductors being connected in series with said direction finding coil and rotatable therewith, whereby deviation of the indicated direction of a source of radio signals, due to the ship, is corrected and the output for a given strength of field due to a signal is increased.

ABRAM A. CORY.